US008806031B1

(12) United States Patent
 Kondur et al.

(10) Patent No.: US 8,806,031 B1
(45) Date of Patent: Aug. 12, 2014

(54) SYSTEMS AND METHODS FOR AUTOMATICALLY DETECTING NETWORK ELEMENTS

(75) Inventors: Umesh Kondur, Union City, CA (US); Quaizar Vohra, Santa Clara, CA (US); Neha A. Kaushil, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 102 days.

(21) Appl. No.: 12/968,769

(22) Filed: Dec. 15, 2010

(51) Int. Cl.
 *G06F 15/16* (2006.01)
 *G06F 15/173* (2006.01)
 *H04L 12/28* (2006.01)

(52) U.S. Cl.
 USPC ............ 709/228; 709/226; 370/389; 370/400

(58) Field of Classification Search
 None
 See application file for complete search history.

(56) References Cited

U.S. PATENT DOCUMENTS

| 6,385,198 | B1 * | 5/2002 | Ofek et al. | 370/389 |
| 2007/0073882 | A1 * | 3/2007 | Brown et al. | 709/226 |
| 2010/0165877 | A1 * | 7/2010 | Shukla et al. | 370/254 |

* cited by examiner

*Primary Examiner* — Wen-Tai Lin
(74) *Attorney, Agent, or Firm* — Cooley LLP

(57) ABSTRACT

A system and method for the automated configuration of network resources is described. In one embodiment, a network management device can manage virtual network entities, such as virtual network switch fabrics, by provisioning physical network resources for and deallocating physical network resources from virtual network entities. The network management device can determine available physical network resources by broadcasting request signals to physical network resources and listening for advertisement response signals from available physical network resources.

19 Claims, 8 Drawing Sheets

SYSTEMS AND METHODS FOR AUTOMATICALLY DETECTING NETWORK ELEMENTS

BACKGROUND

Some embodiments described herein relate generally to computer networks and, more particularly, managing network resources and provisioning of network devices.

Some known networking systems include a centralized control plane that can manage resources connected to the networking system. The resources are added when additional capacity in the networking system is desired or may be required. As a result, the centralized control plane can become extremely large and unmanageable as the number of resources connected to the networking system increases.

Other known networking systems include a distributed control plane. Such known distributed control planes can be implemented at various nodes within the networking system. Such known distributed control planes, however, are not dynamically configured. As such, some nodes within the networking system can be largely under-utilized while other nodes within the networking system can be over-utilized. Furthermore, processing demands on some nodes can exceed capacity while on others it can be well below capacity. Accordingly, such networking systems do not operate as efficiently as desired.

SUMMARY

A system and method for the automated configuration of network resources is described. In one embodiment, a network management device can manage virtual network entities, such as virtual network switch fabrics, by provisioning physical network resources for and deallocating physical network resources from virtual network entities. The network management device can determine available physical network resources by broadcasting request signals to physical network resources and listening for advertisement response signals from available physical network resources.

DETAILED DESCRIPTION

Figure 1:
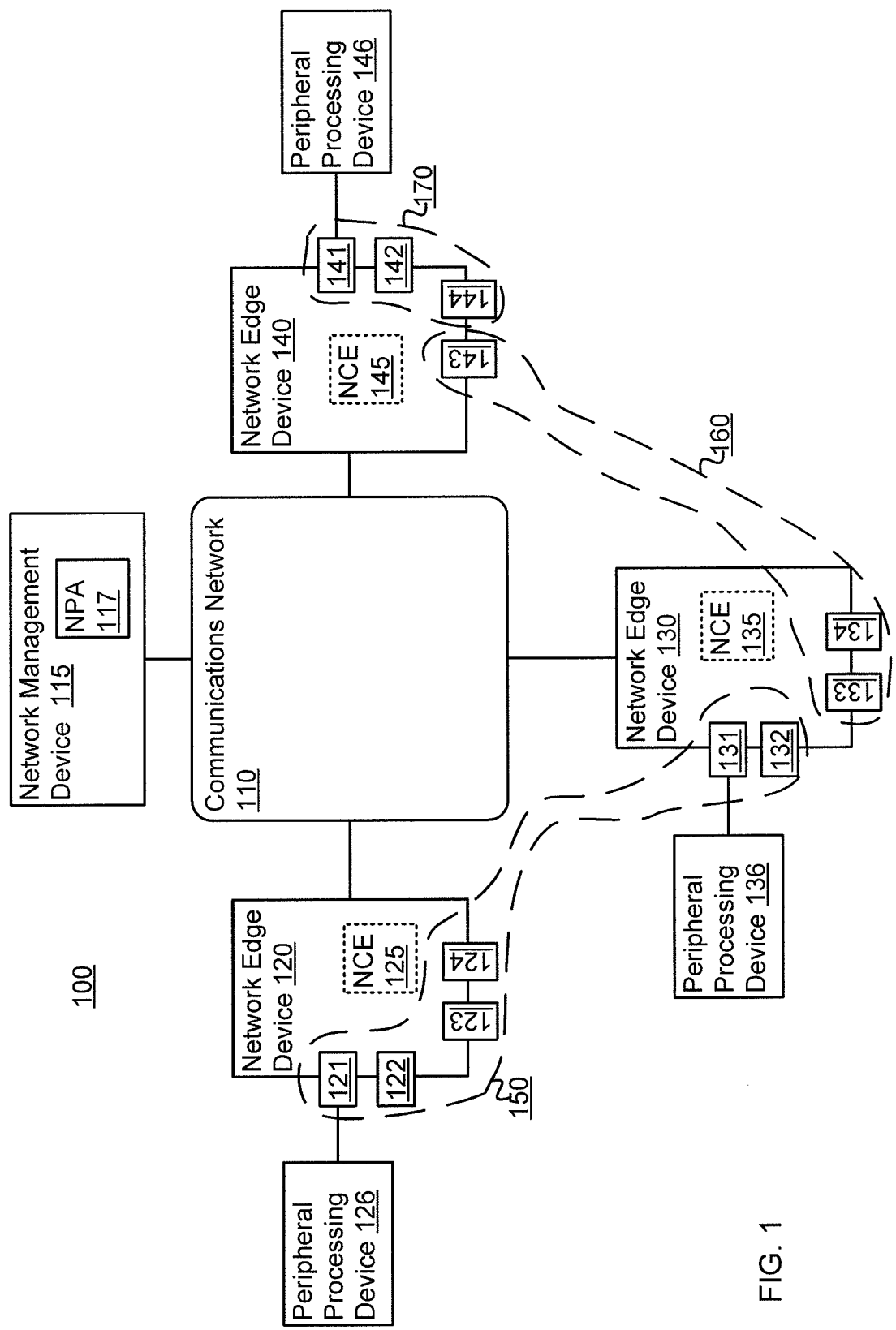
FIG. 1 is a schematic illustration of a switch fabric system, according to an embodiment

In some embodiments, a network management device for managing network resources can be responsible for managing virtual network entities that include one or more physical network resources. In such embodiments, the network management device can add physical network resources to or remove physical network resources from virtual network entities as part of its management responsibilities. In other words, the network management device can define virtual network entity configurations. The network management device can define a virtual network entity configuration in response to a specific request to add physical network resources to or remove physical network resources from virtual network entities. In other embodiments, the network management device can define a virtual network entity configuration in response to a change in processing capacity within a virtual network entity. For example, a change in processing capacity within the virtual network entity that is oversubscribed (e.g., the demand for processing directed to the virtual network entity rises above a threshold) can result in the network management device requesting additional physical network resources for the virtual network entity. Similarly, a change in processing capacity within the virtual network entity that is underutilized (e.g., the demand for processing directed to the virtual network entity falls below a threshold) can result in the network management device requesting that physical network resources be deallocated from the virtual network entity. It should be understood that a network management device can define a virtual network entity configuration in response to other conditions or instructions.

In some embodiments, a network management device for managing network resources can broadcast a request signal to network edge devices or other physical network resources. The request signal can request an availability advertisement response from the network edge devices or other physical network resources. In other embodiments, a network management device for managing network resources can send a request signal to one or more specific network edge devices.

In some embodiments, the request signal can include instructions for the network edge devices or other physical network resource to indicate the number of ports that are available to be provisioned. In other embodiments, the request signal can include instructions for the network edge devices or other physical network resource to indicate whether the network edge device or other physical network resource itself is available to be provisioned. In some embodiments, a network management device for managing network resources can detect when network edge devices become available to be provisioned for a virtual network entity. In such embodiments, the network management device can detect network edge devices that have been recently added to the communications network. Similarly, the network management device can detect network edge devices that have been recently deallocated from a virtual network entities. Further, the network management device can detect ports of a network edge device that have recently been deallocated from a virtual network entity. In such embodiments, network edge devices or other physical network resources are adapted to send an availability advertisement signal to the network management device. It should be understood that such availability advertisement signals can be broadcast to other network devices or targeted to specific network devices, including a network management device for managing network resources.

Embodiments shown and described herein refer to multiple communication layers (e.g., data link layer (layer-2), network layer (layer-3), physical layer (layer-1), application layer (layer-7), etc.). Such communication layers can be defined by open systems interconnection (OSI) model. Accordingly, the physical layer can be a lower level layer than the data link layer. Additionally, the data link layer can be a lower level layer than the network layer and the application layer. Further, different protocols can be associated with and/or implemented at different layers within the OSI model. For example, an Ethernet protocol, a Fibre Channel protocol and/or a cell based protocol (e.g., used within a data plane portion of a communications network) can be associated with and/or implemented at a data link layer while a Border Gateway Protocol (BGP) can be associated with and/or implemented at a higher layer, such as, for example, an application layer. While a BGP can be implemented at the application layer, it can be used to send request signals and advertisement signals used to communicate provisioning request information and provisioning availability information.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules and/or devices in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol (e.g., a first data link layer protocol). Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol (e.g., a second data link layer protocol) can use the destination address of the first protocol (e.g., the first data link layer protocol) to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric can function as part of a single logical hop (e.g., a single large-scale consolidated layer-2 (L2)/layer-3 (L3) switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages. Similarly stated, each stage within a switch fabric can be adjacent stage(s) by physical links while operating collectively as a single logical hop associated with a protocol used to route data outside the switch fabric. Additionally, packet classification and forwarding associated with a protocol (e.g., Ethernet) used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used in this specification, the singular forms "a," "an" and "the" include plural referents unless the context clearly dictates otherwise. Thus, for example, the term "a module" is intended to mean a single module or a combination of modules.

Referring now to FIG. 1, a schematic illustrating a switch fabric system 100 is shown. The switch fabric system 100 includes a network management device 115; a communications network 110; and network edge devices 120, 130, 140; and one or more peripheral processing devices 126, 136, and 146. The peripheral processing devices 126, 136, and 146 are operatively coupled to each other by remaining portions of the switch fabric system 100. The peripheral processing devices 126, 136, and 146 can be, for example, compute nodes, service nodes, routers, and storage nodes, as described in further detail herein. In some embodiments, for example, the peripheral processing devices 126, 136, and 146 include servers, storage devices, gateways, workstations, and/or the like.

The peripheral processing devices 126, 136, and 146 can be operatively coupled to one or more ports 121-124, 131-134, 141-144 of the network edge devices 120, 130, 140 using any suitable connection such as, for example, an optical connection (e.g., an optical cable and optical connectors), an electrical connection (e.g., an electrical cable and electrical connectors) and/or the like. Similarly stated, each port 121-124, 131-134, 141-144 provides a communication interface through which a peripheral processing device 126, 136, and 146 can be operatively coupled to a network edge device 120, 130, 140, as described in further detail herein. As such, the peripheral processing devices 126, 136, and 146 can send data (e.g., data packets, data cells, etc.) to and receive data from the network edge devices 120, 130, 140. In some embodiments, the connection between the peripheral processing devices 126, 136, and 146 and the network edge devices 120, 130, 140 is a direct link. Such a link can be said to be a single physical hop link. In other embodiments, the peripheral processing devices can be operatively coupled to the network edge devices via intermediate modules. Such a connection can be said to be a multiple physical hop link.

Each network edge device 120, 130, 140 can be any device that operatively couples peripheral processing devices 126, 136, and 146 to the communications network 110. In some embodiments, for example, the network edge devices 120, 130, 140 can be access switches devices, input/output modules, top-of-rack devices and/or the like. Structurally, the network edge devices 120, 130, 140 can function as both source network edge devices and destination network edge devices. Accordingly, the network edge devices 120, 130, 140 can send data (e.g., a data stream of data packets and/or data cells) to and receive data from the communications network 110, and to and from the connected peripheral processing devices 126, 136, and 146.

Each of the network edge devices 120, 130, 140 is operable to communicate with the other network edge devices 120, 130, 140 via the communications network 110 (e.g., within both a control plane portion and data plane portion). Specifically, the data plane portion of the communications network 110 provides any-to-any connectivity between the network edge devices 120, 130, 140 at relatively low latency. For example, the data plane portion of the communications network 110 can transmit (e.g., convey) data between network edge devices 120, 130, 140. In some embodiments, the communications network 110 can have at least hundreds or thousands of ports (e.g., egress ports and/or ingress ports) through which network edge devices 120, 130, 140 can transmit and/or receive data.

The network edge devices 120, 130, 140 can host network control entities 125, 135, and 145 to manage the ports 121-124, 131-134, 141-144 of the network edge devices 120, 130, 140. Accordingly, the network control entities 125, 135, and 145 can be part of a control plane of the switch fabric system 100. Each network control entity 125, 135, and 145 can be a process, application, virtual machine, and/or some other software module (executing in hardware) or a hardware module executed at a network edge device 120, 130, 140. As such, instructions that implement the network control entity 125, 135, and 145 can be stored within a memory of a network edge device 120, 130, 140 (e.g., memory 252) and executed at a processor of a network edge device 120, 130, 140 (e.g., processor 251).

Each network control entity 125, 135, and 145 can manage ports 121-124, 131-134, 141-144 of the network edge devices 120, 130, 140. For example, network control entity 145 is operable to manage the ports 141, 142, 144 associated with the group of ports 170, network control entity 135 is operable to manage the ports 133, 134, 143 associated with the group of ports 160, and network control entity 126 is operable to manage the ports 121, 122, 123, 124, 131, 132 associated with the group of ports 150. In some embodiments, each network control entity 125, 135, and 145 can manage and/or maintain configuration information (e.g., port protocol information, network segment assignment information, port assignment information, peripheral processing device information, etc.) and/or forwarding-state information (e.g., port identifiers, network segment identifiers, peripheral processing device identifiers, etc.) associated with its group of ports 150, 160, and 170; monitor a state and/or status of peripheral processing devices associated with its respective group of ports 150, 160, and 170; and/or manage and maintain other information associated with the peripheral processing devices and/or ports associated with its respective group of ports 150, 160, and 170, respectively.

In some embodiments, a network control entity can control and/or manage ports at a network edge device at which the network control entity is located (e.g., network control entity 146 manages the group of ports 170). In other embodiments, a network control entity can have flexibility to also control and/or manage ports at a network edge device other than the network edge device at which the network control entity is located (e.g., network control entity 125 manages ports 131 and 132, and network control entity 135 manages port 143). In such embodiments, the network provision agent 117 has flexibility to request availability information of ports at one network edge device for use by a network control entity at another network edge device, the availability information being based on processing capacity of the ports.

FIG. 1 illustrates how network control entities 125, 135, and 145 can have flexibility to control and/or manage ports at network edge devices at which the network control entity is located and at other network edge devices. By virtue of this flexibility, network control entities 125, 135, and 145 can control and/or manage their respective groups of ports 150, 160, and 170. For example, network control entity 125 can control and/or manage group of ports 150, which includes ports 121-124, 131, and 132. Likewise, network control entity 135 can manage and/or control group of ports 160, which includes ports 133, 134, and 143. Similarly, network control entity 135 can be configured to manage and/or control group of ports 150. Network control entity 145 can manage and/or control group of ports 170, which includes ports 141, 142, and 144.

Group of ports 150, 160, 170 each can be a virtual network entity. In some embodiments, a virtual network entity can be a logical grouping of one or more physical ports (e.g., groups of ports 150, 160, 170) managed as a group. In other embodiments, a virtual network entity can be a logical grouping of one or more network edge devices, such that when a network edge device is provisioned as a virtual network entity, all physical ports of the network edge device are included in the virtual network entity. In other embodiments, a virtual network entity can be a logical grouping of one of more physical ports in which one or more physical ports are located at a first network edge device and one or more physical ports are located at a second network edge device. In still other embodiments, a virtual network entity can be a logical grouping that includes one or more physical ports located at a network edge device where the logical grouping includes some, but not all, of the physical ports located at the network edge device. Furthermore, virtual network entities can be configured as logical groupings of one or more physical ports and/or network edge devices.

In some embodiments a network control entity can be a master network control entity that delegates some management and/or control function to other network control entities. In such embodiments a virtual network entity can be managed, for example, by a hierarchy of network control entities that manage and/or control the network edge devices and/or ports that are included the virtual network entity. In another example, a virtual network entity can be configured as a virtual switch fabric, in which the physical network devices, including network edge devices and/or ports, that are included in the virtual network entity are operatively coupled to form a cohesive network regardless of the physical hop configuration among the physical network devices.

In some embodiments, network provision agent 117 receives instructions for provisioning network resources. For example, network provision agent 117 can accept an instruction from a system administrator or other user through a software command or hardware setting to provision one or more physical network resources to be used in a virtual network entity. In other embodiments, the network provision agent 117 can accept an instruction from another network resource. For example, as described above, an instruction to provision a physical network resource for use by a virtual network entity can be generated automatically when network processing demand on the virtual network entity rises above a threshold. For example, network control entity 125 may generate and send an instruction to network provision agent 117 when network processing demand on group of ports 150 rises above a threshold. In another example, a control plane management entity (not shown) located at network management device 115 or at some other compute device can monitor network processing demands on groups of ports 150, 160, 170 and generate an instruction to provision a physical network resource for use by a virtual network entity when the network processing demand on any of groups of ports 150, 160, 170 rises above a threshold. In some embodiments, the instruction triggers the deallocation of physical network resources from a virtual network entities in response to network processing demand falling below a threshold. In some embodiments an instruction can be automatically generated in response to some other condition. For example, physical network resources may experience faults or failures. In such cases, an instruction can be generated to provision a replacement physical network resource.

In some embodiments, in addition to or instead of receiving an instruction to provision one or more physical network resources for use by or inclusion in a virtual network entity, network provision agent 117 can monitor network processing demands on groups of ports 150, 160, 170. In response to the monitoring of processing demands, network provision agent 117 can provision one or more physical network resource for use by or inclusion in a virtual network entity when the network processing demand on any of groups of ports 150, 160, 170 rises above a threshold. In other embodiments, in addition to or instead of receiving an instruction to deallocate one or more physical network resources from a virtual network entity, network provision agent 117 can monitor network processing demands on groups of ports 150, 160, 170. In response to the monitoring of processing demands, network provision agent 117 can deallocate one or more physical network resource from a virtual network entity when the network processing demand on any of groups of ports 150, 160, 170 falls below a threshold.

The communications network 110 can be any suitable communications network that operatively couples the network edge devices 120, 130, 140 to the other network edge devices 120, 130, 140. Additionally, the communications network can operatively couple the network management device 115 to the network edge devices 120, 130, 140. In some embodiments, the communications network 110 includes a data plane portion and a control plane portion. The control plane portion of the communications network 110 is where the routing protocols and topology of the communications network 110 are managed and controlled. For example, routing tables and configuration files can be maintained as part of the control plane portion of the communications network 110. The control plane portion of the communications network 110 also facilitates transmission of control signals (e.g., configuration information, forwarding-state information, etc.) between the network control entities 125, 135, and 145 and the network provision agent 117. Accordingly, the network control entities 125, 135, and 145 can send configuration information to other network control entities 125, 135, and 145 via the control plane portion of the communications network 110. In some embodiments, the control plane portion of the communications network 110 includes direct links between the network control entity 125 and the network control entities 135 and 145. In other embodiments, the control plane portion of the communications network 110 can include intermediate modules and/or switches to operatively couple the network control entities 135 and 145 with the network control entity 125.

The data plane portion of the communications network 110 facilitates transmission of data between network edge devices 120, 130, 140. The manner of routing data in the data plane portion of the communications network 110 is determined by the routing protocols and topology managed and controlled in the control plane of the communications network 110. In other words, the data plane portion of the communications network 110 implements the routing protocols and topology as managed and controlled by the control plane portion of the communications network 110. In some embodiments, the data plane portion of the communications network 110 is a switch fabric having one or more stages. For example, the data plane portion of the communications network 110 can be a Clos switch fabric network (e.g., a non-blocking Clos network, a strict sense non-blocking Clos network, a Benes network) having multiple stages of switching modules (e.g., integrated Ethernet switches). Such a switch fabric can include any number of stages. In some embodiments, for example, the switch fabric can include five, seven or nine stages. The data plane portion of the communications network 110 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the data plane portion of the communications network 110 can be (e.g., can function as) a single consolidated switch (e.g., a single large-scale consolidated L2/L3 switch). In other words, the data plane portion of the communications network 110 can operate as a single logical entity (e.g., a single logical network element). Similarly stated, the data plane portion of the communications network 110 can be part of a single logical hop between a first network edge device 120, 130, 140 and a second network edge device 120, 130, 140 (e.g., along with the data paths between the network edge devices 120, 130, 140 and the communications network 110). The data plane portion of the communications network 110 can couple (e.g., indirectly connect, facilitate communication between) the peripheral processing devices 126, 136, 146. In some embodiments, the communications network 110 can communicate via interface devices (not shown) operable to transmit data at a rate of at least 10 Gb/s. In some embodiments, the communications network 110 can communicate via interface devices (e.g., Fibre-Channel interface devices) operable to transmit data at a rate of, for example, 2 Gb/s, 4, Gb/s, 8 Gb/s, 10 Gb/s, 40 Gb/s, 100 Gb/s and/or faster link speeds.

Although the data plane portion of the communications network 110 can be logically centralized, the implementation of the data plane portion of the communications network 110 can be highly distributed, for example, for reliability. For example, portions of the data plane portion of the communications network 110 can be physically distributed across, for example, many chassis. In some embodiments, for example, a processing stage of the data plane portion of the communications network 110 can be included in a first chassis and another processing stage of the data plane portion of the communications network 110 can be included in a second chassis. Both of the processing stages can logically function as part of a single consolidated switch (e.g., within the same logical hop) but have a separate single physical hop between respective pairs of processing stages.

Figure 2:
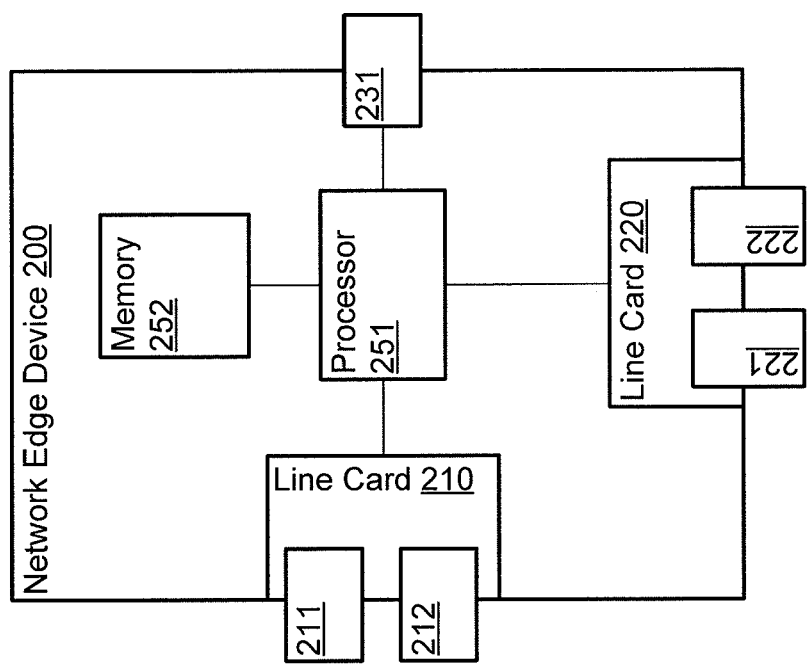
FIG. 2 is a schematic illustration of a network edge device of a switch fabric system, according to another embodiment.

FIG. 2 is a system block diagram of a network edge device 200 similar to the network edge devices 120, 130, 140. The network edge device 200 includes processor 251, memory 252, line card 210, line card 220, and port 231. Processor 251 is operatively coupled to memory 252, line card 210, line card 220 and port 231. Line card 210 includes ports 211 and 212. Line card 220 includes ports 221 and 222. In some embodiments, line cards 210 and/or 220 include one or more processors and/or memories.

Similar to the ports 121-124, 131-134, 141-144 of the network edge devices 120, 130, 140 shown in FIG. 1, ports 211, 212, 221 and 222 can communicate with peripheral processing devices. For example, ports 211, 212, 221 and 222 can implement a physical layer using twisted-pair electrical signaling via electrical cables or fiber-optic signaling via fiber-optic cables. In some embodiments, some of ports 211, 212, 221 and 222 implement one physical layer such as twisted-pair electrical signaling and others of ports 211, 212, 221 and 222 implement a different physical layer such as fiber-optic signaling. Furthermore, ports 211, 212, 221 and 222 can allow network edge device 200 to communicate with peripheral processing devices, such as, for example, computer servers (servers), via a common protocol such as Ethernet or Fibre Channel. In some embodiments, some of ports 211, 212, 221 and 222 implement one protocol such as Ethernet and others of ports 211, 212, 221 and 222 implement a different protocol such as Fibre Channel. Thus, network edge device 200 can be in communication with multiple peripheral processing devices using homogeneous or heterogeneous physical layers and/or protocols via ports 211, 212, 221 and 222.

Port 231 can be in communication with other network edge devices via a communications network such as a switch fabric (e.g., data plane portion of communications network 110). Port 231 can be part of one or more network interfaces (e.g., a 40 Gigabit (Gb) Ethernet interface, a 100 Gb Ethernet interface, etc.) through which the network edge device 200 can send signals to and/or receive signals from a communications network. The signals can be sent to and/or received from the communications network via an electrical link, an optical link and/or a wireless link operatively coupled to the network edge device 200. In some embodiments, the network edge device 200 can send signals to and/or receive signals from the communications network based on one or more protocols (e.g., an Ethernet protocol, a multi-protocol label switching (MPLS) protocol, a Fibre Channel protocol, a Fibre-Channel-over Ethernet protocol, an Infiniband-related protocol).

In some embodiments, port 231 can implement a different physical layer and/or protocol than those implemented at ports 211, 212, 221 and 222. For example, port 211, 212, 221 and 222 can communicate with peripheral processing devices using a protocol based on data packets and port 231 can communicate via a switch fabric using a protocol based on data cells. Said differently, network edge device 200 can be an edge device of a network switch such as a distributed network switch.

In some embodiments, the network edge device 200 can prepare a data packet (e.g., an Ethernet packet) to enter a communications network (e.g., communications network 110). For example, the network edge device 200 can forward, classify, and/or modify the packet encapsulation (e.g., modify, add and/or remove a header portion, footer portion and/or any other identifier included within the data packet) of a data packet prior to sending the data packet to the communications network. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Figure 3:
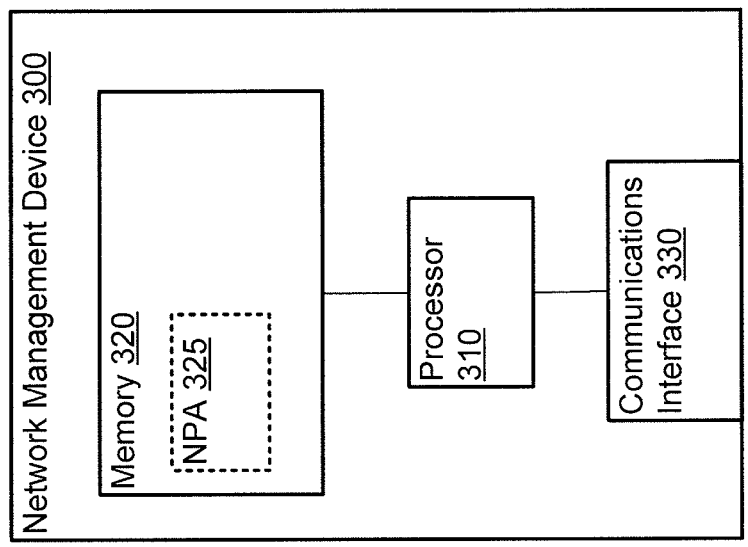
FIG. 3 is a schematic illustration of a network management device of a switch fabric system, according to another embodiment.

FIG. 3 is a system block diagram of a network management device 300 substantially similar to the network management device 115, according to an embodiment. Network management device 300 includes processor 310, memory 320, and communications interface 330. Processor 310 is operatively coupled to memory 320 and communications interface 330. Network management device 300 can communicate with other compute devices, peripheral processing devices and/or network edge devices via communications interface 330.

As illustrated in FIG. 3, network management device 300 can host a network provision agent 325 similar to the network provision agent 117, respectively. In other words, network provision agent 325 can be a process, application, virtual machine, and/or some other software module (executing in hardware) or a hardware module that is executed at network management device 300. In some embodiments, for example, instructions that implement network provision agent 325 can be stored at memory 320 and executed at processor 310.

In some embodiments, network management device 300 can be dedicated to hosting network provision agent 325. In other words, network management device 300 can allocate all or substantially all of its computing resources (e.g., processing capacity and memory) to network provision agent 325. In some embodiments, network management device 300 can host other processes, applications, virtual machines, and/or software modules in addition to network provision agent 325. For example network management device 300 can be a general purpose network management device or compute node that hosts multiple processes, applications, virtual machines, and/or software modules.

Figure 4:
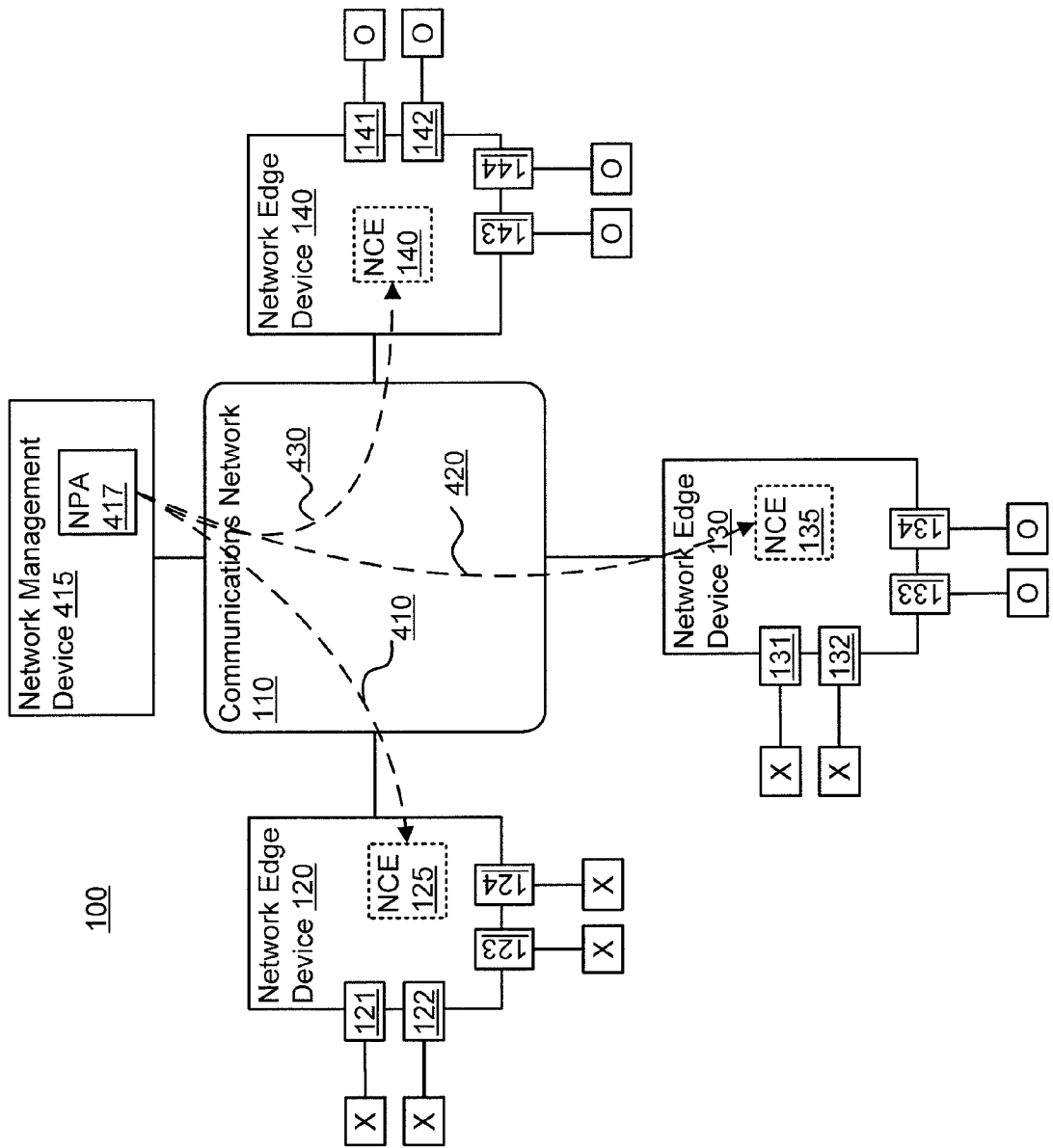
FIGS. 4-8 are schematic illustrations of switch fabric systems, according to other embodiments.

As shown in FIG. 4, the network provision agent 417, hosted at network management device 415, can broadcast a request for available physical network resources. In such an embodiment, each of the network edge devices 120, 130, 140 receives the request. Network control entity 125 of network edge device 120 receives a request signal 410; network control entity 135 of network edge device 130 receives a request signal 420; and network control entity 145 of network edge device 140 receives a request signal 430. In some embodiments, the network provision agent 417 can broadcast a request signal using a lower level communication protocol. For example, network provision agent 417 can send a request signal using a multicast address as used in layers 2 or 3 of the OSI model. In such embodiments, network provision agent 417 can send one request signal that is received by all of the network edge devices (e.g., network edge devices 120, 130, 140) that are operatively coupled to communications network 110. Such a request signal can be broadcast according to a variety of manners including known manners.

In some embodiments, request signals 410, 420, 430 can include information about the request. For example, the request signals 410, 420, 430 can include the number of physical network resources requested by the network provision agent 417. In other embodiments, request signals 410, 420, 430 include a type or types of physical network resources requested by the network provision agent 417. In yet other embodiments, request signals 410, 420, 430 can include a time for which a physical network resource is to be provisioned.

In some embodiments, request signals 410, 420, 430 are communicated to network control entities 125, 135, 145 of network edge devices 120, 130, 140 over the control plane of the switch fabric system 100 using a suitable lower level protocol (e.g., a data link layer protocol), such as, for example, Ethernet and/or Fibre Channel. In this way, the network provision agent 417 can broadcast the request to all network devices, including network edge devices 120, 130, 140 without respect to whether any physical network resource is available to be provisioned.

As FIG. 4 illustrates, all physical network resources need to be provisioned at any given time. For example, FIG. 4 shows that ports 121-124, 131, and 132 are provisioned (labeled by "X"), while ports 133, 134, and 141-144 are not presently provisioned but are available to be provisioned (labeled by "O"). Each of ports 121-124, 131, and 132, indicated as provisioned, can be operatively coupled to a peripheral processing device (not shown in FIG. 4). Similarly, each of ports 133, 134, and 141-144 indicated as not presently provisioned, can also be operatively coupled to a peripheral processing device (not shown in FIG. 4). In some embodiments, a port that is already provisioned for use by or inclusion within a first virtual network entity can be available to be provisioned for use by a second virtual network entity by virtue of some condition. For example, the network processing demand on the first virtual network entity may have fallen below a threshold. In such an embodiment, the port can be deallocated from the first virtual network entity and provisioned for use by or inclusion within the second virtual network entity. In other words, the result can be that the port is moved from the first virtual network entity to the second virtual network entity. In other embodiments, the port can be provisioned for use by or inclusion within the second virtual network entity without being deallocated from the first virtual network entity. In other words, the result can be that the port is included in both the first virtual network entity and second virtual network entity.

In some embodiments, the number of network edge devices or physical network devices (e.g., network edge devices 120, 130, and 140) can be numerous. Consequently, the number of ports, similar to ports 121-124, 131-134, and 141-144, can be numerous. Accordingly, the administration of physical network resources, such as network edge devices 120, 130, 140, and ports 121-124, 131-134, and 141-144, and virtual network entities can be more manageable according to the provisioning techniques described herein.

Figure 5:
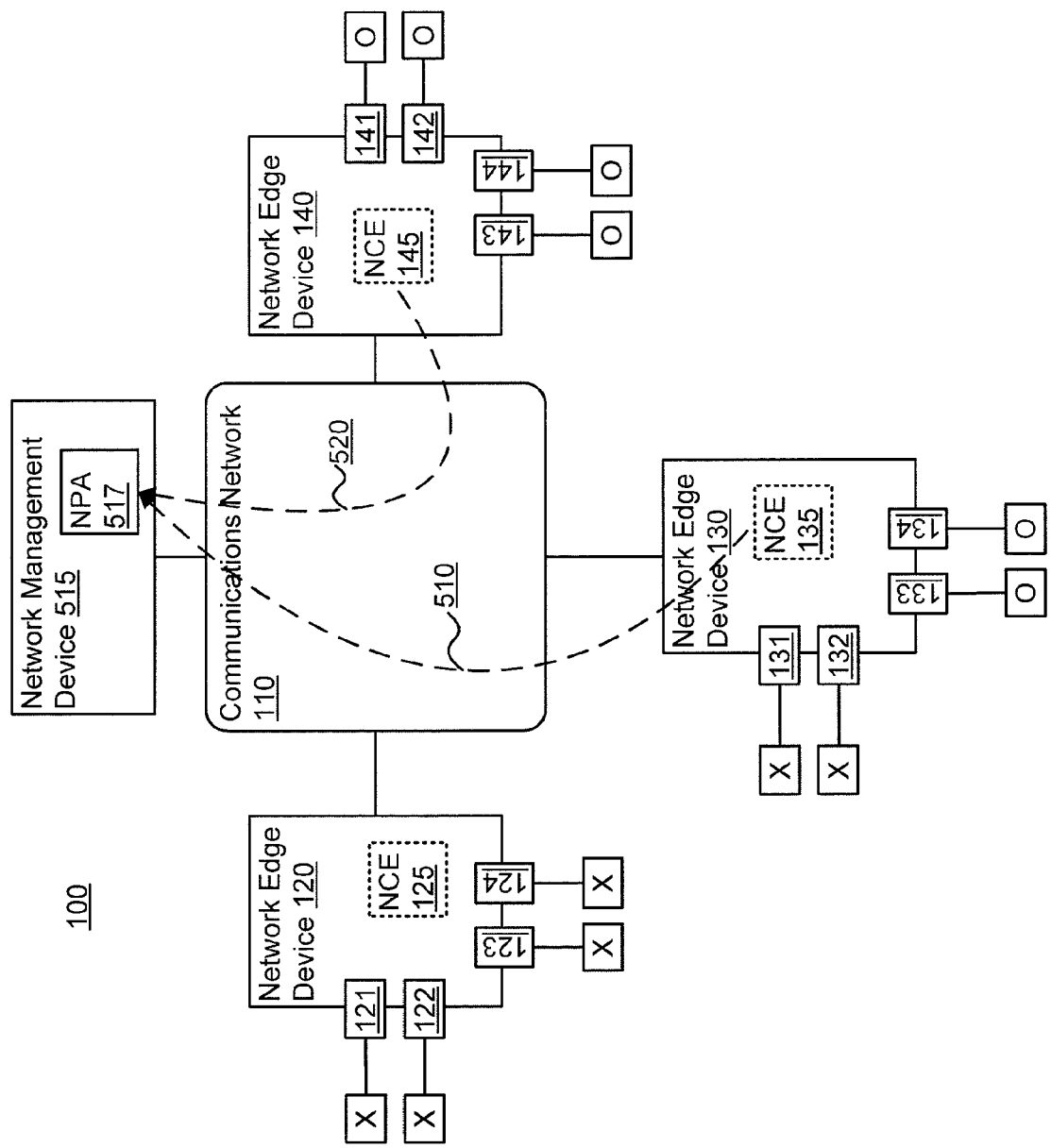

FIG. 5 shows a schematic illustration of another embodiment where a network provision agent 517, hosted at network management device 515, receives advertisement signals 510 and 520 from network control entities 135 and 145 of network edge devices 130 and 140, respectively, having ports available for provisioning. Network control entities 135 and 145 can send availability advertisement response signals 510 and 520 to the network provision agent 517 over the control plane portion of the communications network 110 using a targeted higher level protocol (e.g., an application layer protocol) such as, for example, a Border Gateway Protocol (BGP). In such embodiments, a network control entity 125, 135, 145 can use such a higher level protocol in conjunction with any suitable lower level protocol (e.g., a data link layer protocol), such as, for example, Ethernet and/or Fibre channel, to send availability advertisement response signals 510 and 520. Using a targeted protocol, such as BGP, network control entities 135 and 145 can send availability advertisement response signals 510 and 520 to a specific network management device or network provision agent while refraining from sending an availability advertisement response signal to other network control entities, other network management devices, other network provision agents, or other network elements.

FIG. 5 illustrates that in some embodiments network provision agent 517 can receive more than one availability advertisement signal. In other embodiments, a network provision agent can instead send a first request signal to a first network control entity, receive a response from the first network control entity that no physical network resource is available to be provisioned for use by a virtual network entity, send a second request signal to a second network control entity, and receive an availability advertisement response from the second network control entity. Such polling can also be accomplished by network provision agent sending request signals at time intervals. In other words, a network provision agent can send a first request signal to a first network control entity, wait for an interval of time without receiving a response from the first network control entity, send a second request signal to a second network control entity, and receive an availability advertisement response from the second network control entity.

In some embodiments, availability advertisement response signals 510 and 520 contain information about physical network resources. For example, availability advertisement response signal 510 can include the number of ports available to be provisioned on network edge device 130, port protocol information, network segment assignment information, port assignment information, peripheral processing device information, port identifiers, network segment identifiers, peripheral processing device identifiers, and/or the like. In other embodiments, availability response signal 510 may include other types of availability information. For example, availability information can include simple binary data that indicates whether a port is available or not. In another embodiment, the ports at one network edge device may be partially consumed by network traffic. In such a case, the availability information may include the total bandwidth of each port and the bandwidth consumed by network traffic of each port. In other embodiments, availability information may include the percentage of bandwidth consumed of each port. In other embodiments, availability information may include consumption data for only those ports whose bandwidth consumed is below a certain percentage. In still other embodiments, availability information can include aggregate consumption data for all ports at the network edge device. Other embodiments may include other bandwidth consumption data and/or combinations of types of port and/or network edge device bandwidth consumption data.

In some embodiments, network control entities 135 and 145 of network edge devices 130 and 140 can send availability advertisement response signals 510 and 520 in response to a condition other than receiving a request signal (e.g., request signals 410, 420, 430). For example, network control entity 135 can send availability advertisement response signal 510 in response to network edge device 130 becoming operatively connected to communications network 110. Similarly, network control entity 145 can send availability advertisement response signal 520 in response to the network processing demand of network edge device 140 or ports 141-144 falling below a threshold.

Figure 6:
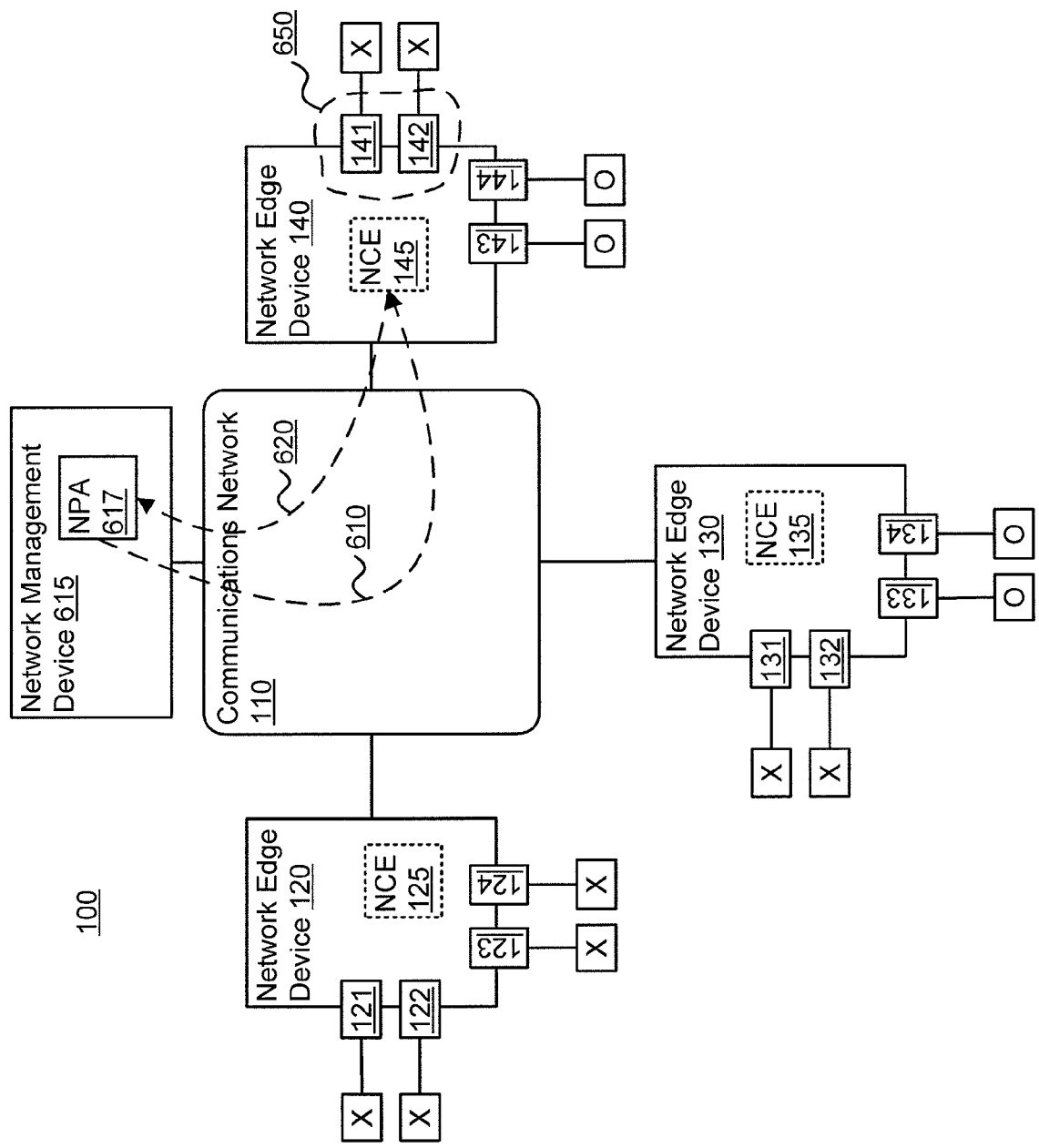

FIG. 6 shows a schematic illustration of an embodiment in which network provision agent 617, hosted at network management device 615, sends a request signal to a specific network control entity 145 of network edge device 140. In such an embodiment, network provision agent 617 can use a targeted higher-level protocol as described above. In that way, network provision agent 617 can target specific physical network resources that may be desirable for provisioning and can avoid sending unnecessary request signals for other physical network resources. Network provision agent 617 can send a targeted request signal 610 over the control plane of communications network 110 to network control entity 145 to request availability of a subset of ports 141 and 142 of network edge device 140. The particular example of FIG. 6 shows that network provision agent 617 sends request signal 610 to request availability information about ports 141 and 142. In response to request signal 610, network control entity 145 sends an availability advertisement response signal 620 that ports 141 and 142 are available to be provisioned for use by or inclusion in virtual network entity 650.

Figure 7:
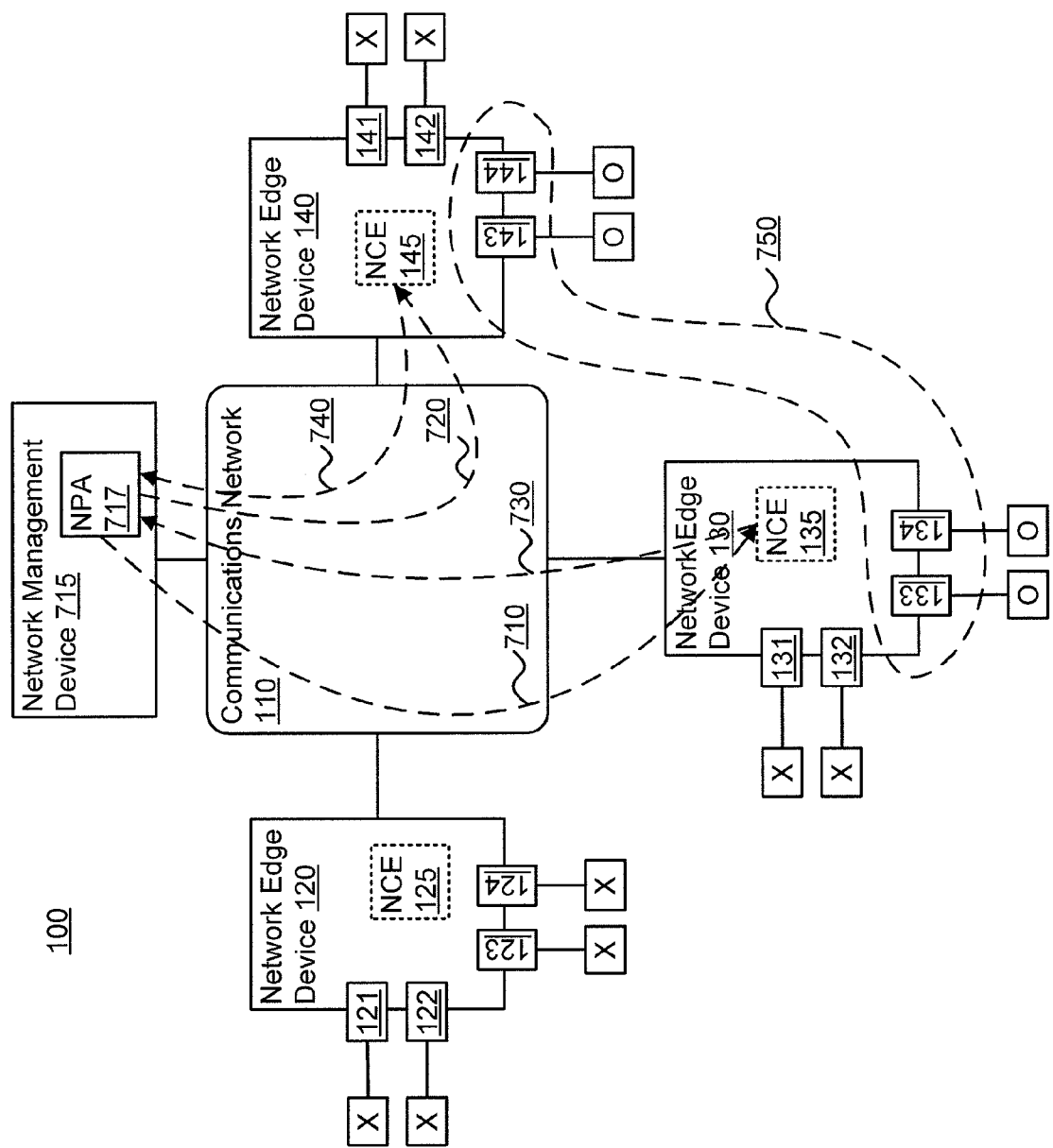

FIG. 7 shows a schematic illustration of an embodiment in which network provision agent 717, hosted at network management device 715, sends targeted request signals 710 and 720 to network control entities 135 and 145 of network edge devices 130 and 140. FIG. 7 further illustrates that in some embodiments, network provision agent 717 can target request signals to multiple network resources. The particular example of FIG. 7 shows that network provision agent 717 sends request signal 710 to request availability information about ports 131-134. In response to request signal 710, network control entity 135 sends an availability advertisement response signal 730, indicating that ports 131 and 132 are unavailable and that ports 133 and 134 are available to be provisioned for use by or inclusion in virtual network entity 750. Likewise, in response to request signal 720, network control entity 145 sends an availability advertisement response signal 740, indicating that ports 141 and 142 are unavailable and that ports 143 and 144 are available to be provisioned for use by or inclusion in virtual network entity 750.

Figure 8:
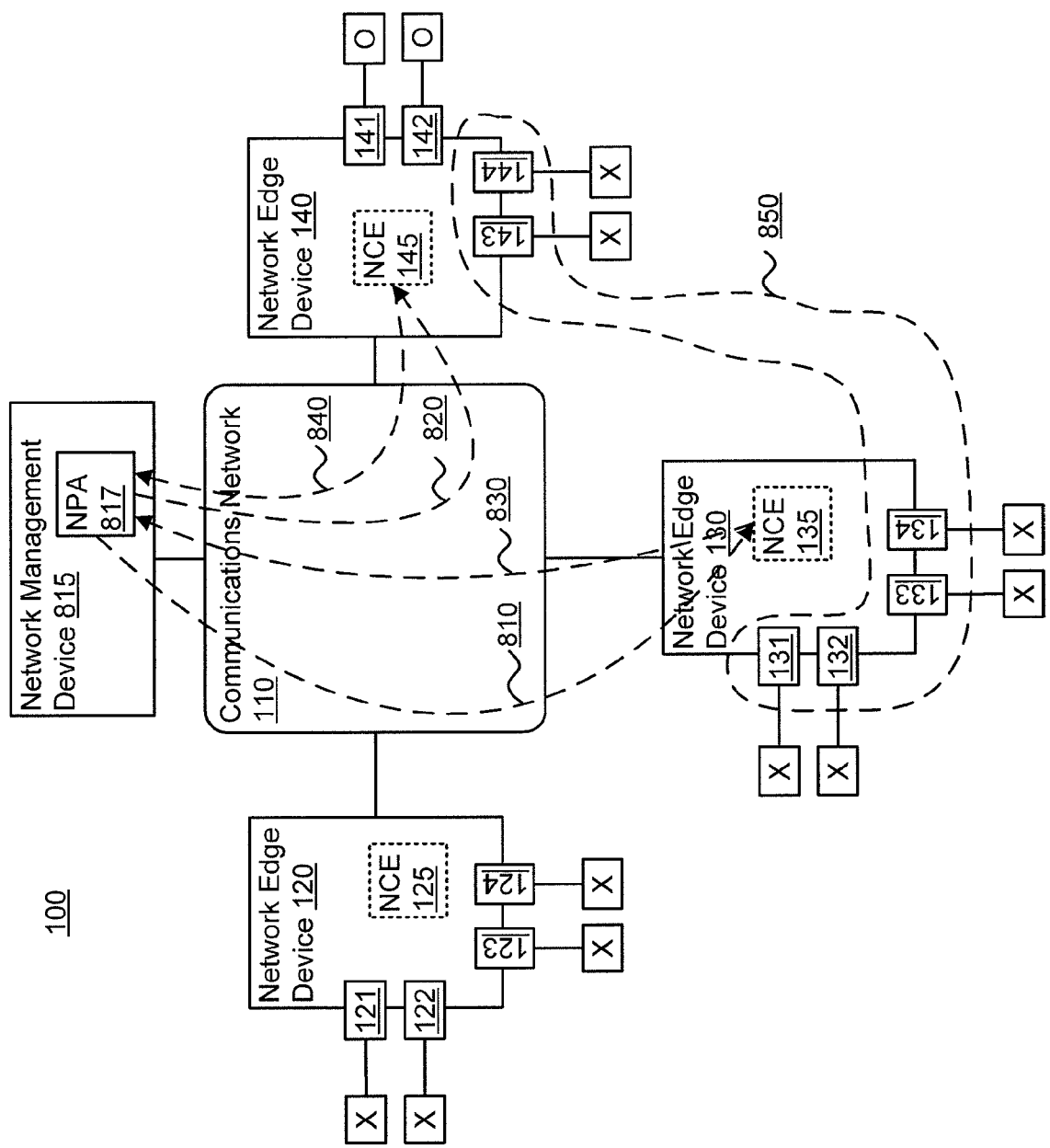

Referring now to FIG. 8, a schematic illustration of an embodiment in which another virtual network entity 850 is provisioned. In some embodiments, a network provision agent can target request signals to any network resources connected to a communication network over the control plane. The particular example of FIG. 8 shows that network provision agent 817 sends request signals 810 over the control plane of switch fabric system 100 to network control entity 135 to request availability information about network edge device 130 and ports 131-134. In response to request signal 810, network control entity 135 sends availability advertisement response signal 830, indicating that network edge device 130 is available to be provisioned for use by virtual network entity 850. Likewise, in response to request signal 820, network control entity 145 sends availability advertisement response signal 840, indicating that ports 143, 144 are available to be provisioned for use by virtual network entity 850 and that ports 141, 142 are not available to be provisioned for use by virtual network entity 850. In response to availability advertisement signals 830 and 840, network provision agent 817 provisions ports 131-134, 143, and 144 for use by virtual network entity 850. In such embodiments, request signals 810, 820 can request availability information about one or more ports of a network edge device or other network device or about one or more network edge devices (e.g., network edge device 120, 130, 140) or other physical network resource.

Figure 9:
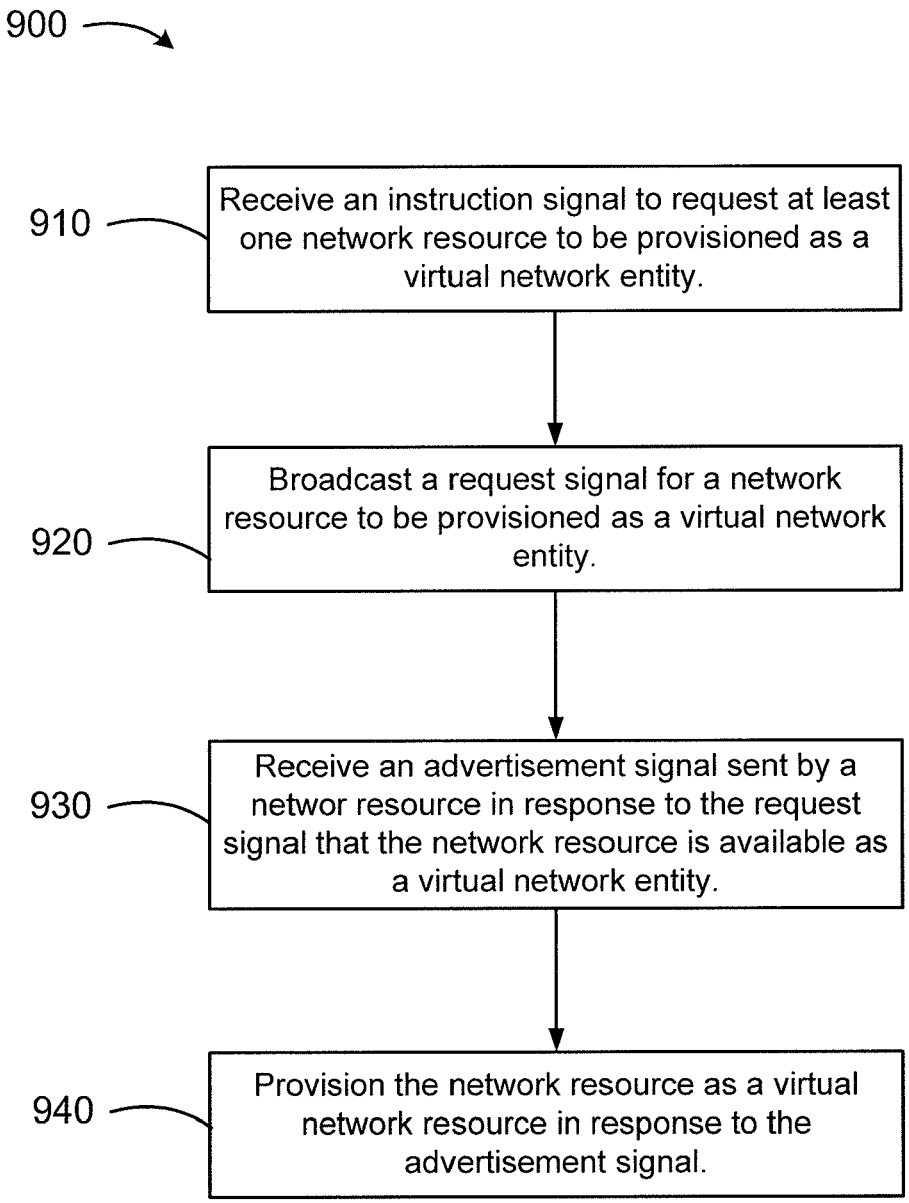
FIG. 9 is a flow chart illustrating a method of automatically detecting network devices, according to another embodiment.

Referring now to FIG. 9, a flow chart illustrating a method 900 for determining the availability of network resources for provisioning is shown. An instruction to request at least one network resource to be provisioned as a virtual network entity is received, at 910. In some embodiments, the instruction can be received from a system administrator or other user through a software command or hardware setting. In other embodiments, the instruction can be received from another network resource. For example, as described above, an instruction can be generated automatically when network processing demand rises above a threshold. In some embodiments, the instruction can trigger the deallocation of physical network resources from a virtual network entities in response to network processing demand falling below a threshold. In some embodiments an instruction can be automatically generated in response to some other condition. For example, physical network resources may experience faults or failures. In such cases, it would be desirable to generate an instruction to provision a replacement physical network resource.

Referring still to FIG. 9, a request signal for a network resource to be provisioned as a virtual network entity is broadcast, at 920. As described above, a suitable lower-level network protocol can be used to broadcast a request signal over a control plane. An advertisement signal sent by a network resource in response to the request signal that the network resource is available as a virtual network entity is received, at 930. The advertisement signal can likewise be communicated over a control plane. As described above, a suitable lower-level network protocol can be used to broadcast the advertisement signal. Similarly, a suitable higher-level network protocol can be used to target the advertisement signal to the network resource that sent the request signal.

The network resource is provisioned as a virtual network entity in response to the advertisement signal, at 940. In some embodiments, a network resource can be provisioned according to the system and method shown and described in co-pending U.S. patent application Ser. No. 12/968,848, entitled "Methods and Apparatus for Dynamic Resource Management Within a Distributed Control Plane of a Switch," which is incorporated herein by reference in its entirety.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software to perform computations on relatively heavy network workloads. In some embodiments, the services nodes can perform computations on a per packet basis in a relatively efficient fashion (e.g., more efficiently than can be performed at, for example, a compute node 110). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices operable to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, some embodiments of a switch fabric system (e.g., FIG. 1) include a route reflector within the control plane of the switch fabric system while others do not.

What is claimed is:

1. An apparatus, comprising:
a network management device configured to host a network provision agent,
the network management device configured to send a request signal from the network provision agent to a first network edge device hosting a network control entity that is configured to manage a plurality of ports at the first network edge device and at a second network edge device, such that the network control entity determines an availability of at least one port from the plurality of ports at the first network edge device and at least one port from the plurality of ports at the second network edge device for being provisioned as at least a portion of a virtual network entity in response to the request, the request signal including a request for information including (1) a number of network access ports to be provisioned as the virtual network entity, and (2) a type of network device to be provisioned as the virtual network entity,
the network management device configured to receive an availability signal from the network control entity based on an availability of the at least one port from the plurality of ports at the first network edge device and the at least one port from the plurality of ports at the second network edge device for being provisioned in response to the request.

2. The apparatus of claim 1, wherein the virtual network entity is a virtual switch fabric network resource, the network management device configured to be operatively coupled to the first network edge device and the second network edge device through a switch fabric associated with the virtual switch fabric network resource.

3. The apparatus of claim 1, wherein the request signal from the network provision agent includes a request for information including a time that the first network edge device is to be provisioned as the virtual network entity.

4. The apparatus of claim 1, wherein the availability signal from the first network control entity includes information selected from the group of: a number of available network access ports of the first network edge device available to be provisioned as the virtual network entity, a network device type of the first network edge device, and a time of availability of the first network edge device.

5. The apparatus of claim 1, wherein the network management device includes an input port configured to accept an instruction to send the request from the network provision agent.

6. The apparatus of claim 1, wherein the network provision agent is configured to detect a connection between the network management device and the first network edge device.

7. The apparatus of claim 1, wherein the network provision agent is to be operatively coupled to a control plane of a switch fabric system, the network provision agent configured to send the request signal over the control plane, the network provision agent configured to receive the availability signal over the control plane, and
the network control entity is to be operatively coupled to the control plane.

8. The apparatus of claim 1, wherein the network provision agent is to be operatively coupled to a control plane of a switch fabric system distributed across a plurality of network devices, and
the network control entity is to be operatively coupled to the control plane.

9. An apparatus, comprising:
a first network edge device configured to host a network control entity (1) to be operatively coupled to a control plane of a switch fabric system and (2) configured to manage a plurality of ports at the first network edge device and at a second network edge device, the plurality of ports including at least one port at the first network edge device and at least one port at the second network edge device;

the first network edge device configured to receive, at the network control entity, a request from a network provision agent hosted at a network management device over the control plane, the network control entity configured to determine an availability of the first network edge device and the second network edge device for being provisioned as a component of a virtual network entity in response to the request, the request including (1) a number of network access ports to be provisioned as the virtual network entity, and (2) a type of network device to be provisioned as the virtual network entity, the first network edge device configured to send, over the control plane, an availability signal to the network management device in response to the request.

10. The apparatus of claim 9, wherein the virtual network entity is a virtual switch fabric network resource.

11. The apparatus of claim 9, wherein the request signal from the network provision agent includes a request for information including a time that the first network edge device is to be provisioned as a virtual network entity.

12. The apparatus of claim 9, wherein the availability signal from the first network edge device includes information selected from the group of: a number of available network access ports of the first network edge device and the second network edge device available to be provisioned as the virtual network entity, a network device type of the first network edge device, and a time of availability of the first network edge device.

13. The apparatus of claim 9, wherein the network management device includes an input port to accept an instruction configured to send the request from the network provision agent.

14. The apparatus of claim 9, wherein the network provision agent is configured to detect a connection between the first network edge device and the network management device.

15. A method, comprising:
sending, from a network provision agent hosted at a network management device, a request for a first network edge device from a plurality of network edge devices to be provisioned as a virtual network entity, the network provision agent operatively coupled to a control plane of a switch fabric system, the request sent over the control plane and to the plurality of network edge devices, such that the first network edge device sends an advertisement in response to the request and a second network edge device from the plurality of network edge devices determines the second network edge device does not have availability as the virtual network entity in response to the request; and receiving, at the network provision agent, the advertisement sent by a network control entity hosted at the first network edge device in response to the request, the advertisement indicating the first network edge device is available as the virtual network entity, the advertisement received over the control plane, the network control entity configured to manage a plurality of ports at the first network edge device and at the second network edge device, the plurality of ports including at least one port at the first network edge device and at least one port at the second network edge device.

16. The method of claim 15, wherein the virtual network entity is a virtual switch fabric network resource.

17. The method of claim 15, further comprising:
receiving, at the network provision agent, an instruction to request at least one network edge device to be provisioned as a virtual network entity, the instruction received over the control plane, the sending the request being made in response to the receiving the instruction.

18. The method of claim 15, further comprising:
detecting, by the network provision agent, that the first network edge device is operatively coupled to the network provision agent, the detecting being through the control plane;

the sending the request being made in response to the detecting.

19. The method of claim 15, wherein the request is sent from the network provision agent such that at least the first network edge device is provisioned as the virtual network entity in response to the request.

* * * * *